United States Patent [19]

Dichter et al.

[11] 4,421,569

[45] Dec. 20, 1983

[54] CORROSION PROTECTION OF STEEL PIPES

[75] Inventors: Michael Dichter; Carl Horowitz, both of Brooklyn, N.Y.

[73] Assignee: Sharon Tube Corp., Sharon, Pa.

[21] Appl. No.: 376,549

[22] Filed: May 7, 1982

[51] Int. Cl.³ .................................................. C23C 1/10
[52] U.S. Cl. ............................. 148/6.14 R; 106/14.11; 427/318; 427/319; 427/386; 427/388.1; 427/388.2; 427/388.4; 427/399; 523/410; 523/411; 523/412; 138/145; 138/DIG. 6
[58] Field of Search ....................... 523/410, 411, 412; 148/6, 31.5, 6.14 R; 106/14.11; 138/145; 427/399, 318, 319, 386, 388.4, 388.2, 388.1

[56] References Cited

U.S. PATENT DOCUMENTS

| | | | |
|---|---|---|---|
| 4,105,811 | 8/1978 | Horowitz et al. | 427/302 |
| 4,106,955 | 8/1978 | Horowitz et al. | 148/6 |
| 4,107,228 | 8/1978 | Horowitz et al. | 427/386 X |
| 4,210,702 | 7/1980 | Dalibor | 428/413 |
| 4,230,766 | 10/1980 | Gaussens et al. | 428/288 |
| 4,314,917 | 2/1982 | Wolfrey | 427/386 X |
| 4,324,715 | 4/1982 | Emerick | 523/400 |

*Primary Examiner*—Thurman K. Page
*Attorney, Agent, or Firm*—Steinberg & Raskin

[57] ABSTRACT

Polymeric coatings are provided on steel pipes to protect the same against corrosion. Monomers and prepolymers are permanently adhered to the surface of steel pipes by graft polymerization to form a barrier which keeps out moisture, oxygen and other corrosive gases from the steel substrate. The monomers and prepolymers are chosen to provide a low moisture vapor transmission rate and oxygen permeability.

10 Claims, No Drawings

CORROSION PROTECTION OF STEEL PIPES

BACKGROUND OF THE DISCLOSURE

Organic coatings are not provided presently in the production of steel pipes used for transporting liquids and gases for the purpose of protecting the pipes against corrosion. Consequently, even in the corrosion plant, particularly during storage, the pipes become corroded which corrosion is even greater during shipping of the pipes to the wholesalers and users thereof. Such corrosion is particularly pronounced in open air storage.

Water readily dissolves a small amount of oxygen from the atmosphere and this, when condenced on the surface of the pipes, becomes highly corrosive. Consequently, such pipes have to be thoroughly cleaned before they can be painted.

Attempts to provide an organic coating on the pipes during the final stage of production thereof have not been satisfactory and it has not been possible to obtain protection for an adequate period of time. The known coatings have a tendency to blister and separate after a short period of time under the stress of reactions caused by the water and oxygen permeating through the coating and between the coating and the pipe because of insufficient adhesion between the coating and the pipe surface.

SUMMARY OF THE INVENTION

In accordance with the present invention selected monomers and selected prepolymers, in selected proportions, are graft polymerized onto the surface of steel pipes to provide a strongly bonded corrosion protective coating on the surface of the steel.

It is accordingly a primary object of the present invention to provide for the chemical attachment of an organic coating onto the surface of steel pipes and the like to effect corrosion protection of the surface.

It is another object of the present invention to provide a method of chemically grafting selected organic prepolymers and monomers onto a steel surface to strongly bond the same thereto and to provide low permeability to oxygen and low moisture transmission rate, thus obtaining improved corrosion protective properties.

In order to achieve the desired chemical grafting onto the surface of the steel pipe and to obtain the desired corrosion protection, it has been found that the monomers used in the graft polymerization are as follows: hydroxyethyl and hydroxypropyl methacrylates; methyl, ethyl and butyl acrylates and methacrylates; dimethylamino and diethylamino ethylacrylates and methacrylates; and vinyl pyrrolidone. These monomers may be used alone or in mixtures thereof.

The prepolymers to be used according to the present invention are as follows: epoxy resins based on bisphenol A and epichlorohydrin; polyfunctional epoxy novolac resins which may be either phenol based or cresol based; water reducible epoxy esters; water reducible urethane prepolymers; and hydroxyl and carboxyl terminated acrylic prepolymer emulsions.

The selected monomer and prepolymer, along with a graft initiator and possibly a catalyst is formed into an aqueous emulsion which is applied to the surface of the steel pipe and cured there where it becomes chemically grafted onto the surface to form a protective coating thereon.

The amount of the monomer should be between 3-10% of the overall composition, preferably 3-5%.

The amount of the prepolymer, if an epoxy ester should be between 30-50%, preferably 30-40% by weight, and if a hydroxyl or carboxyl terminated acrylic prepolymer the amount should be between 40-65%, preferably 50-60%.

In effecting the graft polymerization in accordance with the present invention a graft initiator should be used. The graft initiator may be a silver, ferric, ferrous, cupric or cobalt salt or a mixture thereof. A preferred initiator is ferrous ammonium sulfate. The amount of the initiator is generally between abount 0.01–0.05% by weight, preferably 0.02–0.03% by weight of the weight of the monomers.

The catalyst may be a peroxide such as hydrogen peroxide or urea, or a persulfate such as ammonium persulfate or potassium persulfate. It is also possible to use an acid catalyst such as paratoluene sulfonic acid. A preferred catalyst is ammonium persulfate. The amount of the catalyst is generally between about 0.5–1.5%, preferably 0.8–1.0% by weight of the weight of the monomers. In carrying out the process, the monomer, prepolymer, graft initiator and catalyst are mixed together with water to form an emulsion. It is desirable to include a defoamer for aqueous emulsions, preferably in an amount of 0.08–1.5% by weight of the active ingredients. The use of the defoamer is particularly important where the formulation is to be applied by airless spraying in a closed area so that the excess of the product is returned to the container for further use. Any commercially available defoamer may be used. A suitable defoamer is Napco Defoamer 267A which has given good results in the process.

Although the mechanism of reaction between the steel surface and monomers or prepolymers is not fully established, it is believed that in the presence of moisture, a layer of oxides and hydroxyl groups becomes tenaciously bound to the steel substrate. The hydrogen of the hydroxyl group may be removed by the graft initiator to form a radical which reacts with the monomer starting graft polymerization. The oxides and hydroxyl groups react with epoxy groups of the prepolymers or monomers starting a chemical reaction which also leads to a strong bonding between the steel and organic polymer formed on the surface.

Thus, the mechanism of graft polymerization may be presented in a series of steps as follows:

 (1)

$$Fe-OH + G^+ \rightarrow FeO \cdot + G + H^+$$

Fe            Radical formation

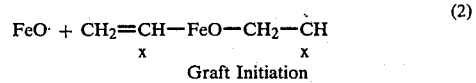 (2)

$$FeO \cdot + CH_2=CH \rightarrow FeO-CH_2-\overset{\cdot}{CH}$$
$$\phantom{FeO \cdot + CH_2=}x \phantom{\rightarrow FeO-CH_2-}x$$

Graft Initiation

 (3)

$$FeO-CH_2-\overset{\cdot}{CH} +$$
$$\phantom{FeO-CH_2-}x$$

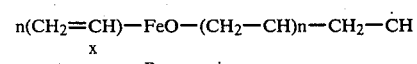

$$n(CH_2=CH) \rightarrow FeO-(CH_2-CH)n-CH_2-\overset{\cdot}{CH}$$
$$\phantom{n(CH_2=CH) \rightarrow FeO-(CH_2-}x$$

Propogation

-continued

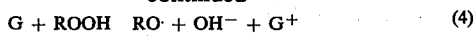

Peroxide    Regeneration of the graft initiator and free radical.

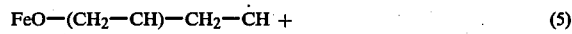

$$RO \cdot FeO-(CH_2-CH)_{n+1}-OR$$

Termination

The process of termination may proceed differently when the formulation contains reactive prepolymers or polymers. The prepolymers may also undergo activation by the graft initiator giving reactive radicals P· which react with the radical on the steel surface forming a graft coating on the substrate:

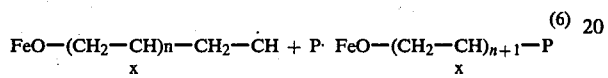

The graft initiator G may consist of the following metal ions: $Fe^{+++}/Fe^{++}$, $Ag^+$, $Co^{++}$ $Cu^{++}$ and the peroxide should be chosen from the water soluble catalysts such as hydrogen peroxide, urea peroxide, ammonium and potassium persulfate.

The monomers and prepolymers have side functional groups X, which may react between themselves and with additional prepolymers or polymers included in the formulation forming a graft crosslinked organic coating. The functional groups of the monomers and prepolymers should consist of hydroxyl groups, carboxyl groups, secondary and/or tertiary amino groups and epoxy groups. The molecular ratio of the functional groups of the reactive components should be adjusted so that no free groups should be left after the reaction is finished.

The physical and chemical properties of the prepolymers and monomers included in the formulation have been chosen so that a high level of corrosion protection could be achieved.

It is most desirable to use a mixture of monomers, namely a mixture of hydroxyethyl methacrylate, butyl methacrylate and diethylaminoethyl methacrylate. Best results are obtained utilizing such mixture of monomers in a ratio of 3:7:1 (by weight).

It is most desirable to use along with the monomers a water reducible epoxy ester prepolymer and an aqueous emulsion of a copolymer of hydroxyethyl methacrylate and methyl and butyl methacrylate.

The hydroxy groups of the acrylic copolymer react with the carboxyl groups of the epoxy polyester forming an acrylic modified epoxy polyester which is activated by the graft initiator and attached to the steel surface according to equation 6. It has been established that commercially available epoxy ester products such as Epotuf 38-69 by Reichhold Chemical Inc. are very useful, the latter being especially so since it is water reducible and permits formulation of a water based system graft treatment. The acid number of this product is 57, which permits it to be modified with a hydroxyl group terminated acrylic monomer or prepolymer. As prepolymer commercial products have also been found to be very useful, especially acrylic emulsion, Rhoplex AC-1533 produced by Rhom & Haas.

The following indicates the general method of preparation and application of the formulations in accordance with the invention:

A required amount of epoxy ester prepolymer is taken in a container and to this an equal amount of water is introduced and mixed slowly by introducing an amine such as morpholine, dimethylaminoethanol or triethylamine until the product has a pH of 7.5 to 8. Then the acrylic emulsion is introduced, followed by the additional required amount of water. Finally, by constant stirring, the monomers, catalyst, graft initiator and other remaining components are introduced and the entire formulation is mixed for an additional 15 minutes until a uniform composition is obtained.

The thus prepared reactive formulation has been used for coating pieces of hot rolled continuous weld pipe. The pieces of pipe were heated up to 120°–140° F. and dipped for 3–4 seconds in the graft formulation, or sprayed and then left for drying and curing. After 2–3 minutes, the pipes were tack free and after 10 minutes fully cured. A coating of 0.6 to 1.0 mil thickness allows the pieces of pipe to withstand up to 200 hours in a salt spray (90° F.—5% salt) without blistering and rusting.

The corrosion preventive formulation can be applied by airless spraying directly when the pipes come out from production and if necessary, the pipes may in addition be heated to 120°–140° F.

By proceeding in accordance with the present invention, the grafted monomers which are grafted onto the steel surface provide a strong bonding and protect the surface by the organic coating thereon. The hydroxyl functional group of the monomers such as ethyl methacrylate can react with the epoxy or hydroxyl groups of the epoxy ester to provide an additional bonding between the active polymer chains formed on the metal surface and the B polymers. The acrylics and methacrylic monomers, particularly butyl methacrylate and diethylaminoethyl methacrylate help to provide a uniform flexible film with good corrosion protection properties.

The modified acrylic prepolymer is the main part of the formulation which permits the obtention of curing in a short time to a suitable thickness of the protective coating. The monomers in the formulation create a bonding between the metal and the acrylic polymer.

In the case of the use of the hydroxyl terminated acrylic prepolymers, and carboxyl terminated prepolymers, the amount of hydroxyl terminated acrylics and carboxyl terminated prepolymers depends on the hydroxyl number and carboxyl number of the prepolymers and the same are adjusted in suitable proportion so that the free carboxyl groups of the epoxy ester fully react with the hydroxyl groups of the acrylics. The grafting of the epoxy polyester esterified by the acrylic prepolymer are to the metal surface by means of the monomers or directly onto the metal surface results in the formation of a smooth protective fill on the surface of the pipes.

In order to obtain better solubilization of the epoxy ester in water it is advisable to neutralize the carboxyl groups with an amine such as triethylamine, diethylaminoethanol, morpholine or an aqueous solution (10–15%) of ammonia. Triethylamine and morpholine are preferred. The amount of the amine depends on the amount of the epoxy ester introduced into the formulation and is preferably such as to provide the pH of the aqueous reduced epoxy to a level of about 6.8–7.2.

An aqueous solution of paratolueno sulfonic acid neutralized with diethylaminoethanol is used to accelerate the reaction between the carboxyl and hydroxyl groups of the prepolymers. The preferred amount of such catalyst is generally about 0.07–0.14% of the weight of the amount of prepolymers introduced into the formulation.

DESCRIPTION OF PREFERRED EMBODIMENTS

The following examples are given to illustrate the present invention. The scope of the invention is not, however, meant to be limited to the specific details of the examples.

EXAMPLE 1

A composition is prepared of the following components:

| | | Parts By Weight |
|---|---|---|
| 1. | Epoxy ester prepolymer/Epotuf 38-690 - 70% solid | 30.0 |
| 2. | Methyl isobutyl ketone | 10.0 |
| | which are mixed together, after which is added: | |
| 3. | Water | 20.0 |
| 4. | Triton FC-10 | 0.2 |
| 5. | Acrylic prepolymer emulsion WL-81 (41.5% solid) | 70.0 |
| 6. | Monomer mixture prepared from: | 2.0 |
| | Hydroxyethyl methacrylate:butyl methacrylate:diethylaminoethyl methacrylate = 3:7:1 | |
| 7. | Ammonium persulfate (10% solution in water) | 0.2 |
| 8. | Ferrous ammonium sulfate (2% solution in water) | 0.2 |
| | Reactive ingredients - 38.7% | |

Several pieces of steel pipe (1"×6") were treated with the above formulation and then tested for corrosion resistance in the salt spray according to ASTM# B-117-73. After 120 hours, no blistering or rust formation was observed.

EXAMPLE 2

The following components are mixed in the order given:

| | | Parts By Weight |
|---|---|---|
| 1. | Epoxy ester prepolymer epotuf 38-690 | 300.0 |
| 2. | Morpholine | 20.0 |
| 3. | Methyl carbitol acetate | 100.0 |
| 4. | Cobalt Naphtenate solution (6%) | 1.0 |
| 5. | Water | 150.0 |

The catalyst for accelerating the reaction between the epoxy ester prepolymer and the hydroxyl terminated acrylic prepolymer is prepared as follows:

| | | Parts By Weight |
|---|---|---|
| 1. | p-Toluene sulfonic acid | 10.0 |
| 2. | Dimethylamino ethanol | 10.0 |
| 3. | Water | 80.0 |

The final formulation is prepared by mixing the following ingredients in the given order:

| | | Parts By Weight |
|---|---|---|
| 1. | Acrylic prepolymer emulsion (Rhoplex WL-81) | 200.0 |
| 2. | Water | 38.0 |
| 3. | Part A - epoxy ester solution | 142.0 |
| 4. | Monomer Mixture as in example 1 | 5.0 |
| 5. | Ammonium Persulfate (10% solution in water) | 0.5 |
| 6. | Ferrous ammonium sulfate (2% solution in water) | 0.5 |
| 7. | Catalyst B (part B) | 5.0 |
| 8. | Defoamer 267A (Napco Chemicals) | 1.0 |
| | Reactive components - 36% | |

The prepared formulation exhibits good stability at low and elevated temperature. Samples of steel pipe treated with this formulation also passed the 120 hours salt spray test without rusting and blistering.

EXAMPLE 3

In this example a hydroxy terminated styrene acrylic emulsion was used. The other components were the same.

| | | Parts By Weight |
|---|---|---|
| 1. | Styrene acrylic emulsion (Rhoplex 1533 - 46.5% solid) | 22.20 |
| 2. | Water | 4.20 |
| 3. | Part A from example 2 | 15.90 |
| 4. | Catalyst Part B from example 2 | 0.30 |
| 5. | Monomer mixture | 1.00 |
| 6. | Ammonium persulfate (10% solution) | 0.10 |
| 7. | Ferrous ammonium sulfate (2% solution) | 0.10 |
| 8. | Defoamer 267A | 0.10 |
| | Reactive components - 38.3% | |

The emulsion based on this formulation showed excellent low and elevated temperature stability and good corrosion protection properties of the treated samples of steel pipe.

EXAMPLE 4

The following components were used, introducing the same by stirring in the given order:

| | | Parts By Weight |
|---|---|---|
| 1. | Epoxy ester (Epotuf 38-690) | 91.70 |
| 2. | Triethyl amine | 6.00 |
| 3. | Mixture (1:1) of organic salt of cobalt & manganese (6% solution) | 1.00 |
| 4. | Cellosolve acetate | 16.00 |
| 5. | Acrylic emulsion Rhoplex WL-81 | 244.20 |
| 6. | Monomer mixture | 3.50 |
| 7. | Water | 120.00 |
| 8. | Ammonium persulfate (10% sol.) | 0.35 |
| 9. | Ferrous ammonium sulfate (2% sol.) | 0.35 |
| 10. | Catalyst prepared as part B in example 2 | 3.40 |
| 11. | Defoamer -267A | 1.25 |
| | Reactive components: 34.1% | |

The heat stability of the formulation prepared according to this example is very good. The corrosion protection after 100 hours in the salt spray is good.

EXAMPLE 5

The same ingredients as in Example 4 were used, except that instead of triethylamine a mixture of 1:1 ratio of morpholine and triethylamine was used. The ferrous ammonium sulfate replaced the copper sulfate and the same amount was used. The treated samples of steel pipe exhibited similar corrosion resistance as the samples in the previous examples. One yard pieces of steel pipe treated with formulations prepared according to Examples 1, 2, 3 and 4 exposed to open air conditions for one year did not show any rust or damages of the treatment.

While the invention has been illustrated with respect to particular formulations, it is apparent that variations and modifications can be made without departing from the spirit or scope of the invention.

What is claimed is:

1. Composition which when cured in contact with a steel object forms a coating thereon to protect the steel object against corrosion, said composition comprising an aqueous emulsion of:
   (a) hydroxyethyl or hydroxypropyl methacrylate, methyl, ethyl or butyl acrylates or methacrylates, dimethylamino or diethylamino, ethylacrylates or methacrylates, or vinyl pyrrolidone, or mixtures thereof, as monomer,
   (b) epoxy resins based on bisphenol A and epichlorohydrin, phenol based or cresol based poly functional epoxy novolac resins, water reducible epoxy esters, water reducible urethane prepolymers or hydroxyl terminated or carboxyl terminated acrylic prepolymers, as prepolymer,
   (c) a silver, ferric ferrous, cupric or cobalt salt or mixtures thereof as graft initiator,
   (d) a peroxide or persulfate as catalyst, and
   (e) water.

2. Composition according to claim 1 wherein the amount of the monomer is 3–10% of the composition, the amount of the prepolymer is 30–50% of the composition when a prepolymer is an epoxy ester and is 40–65% of the composition when the prepolymer is a hydroxyl or carboxyl terminated acrylic prepolymer, the amount of the graft initiator is 0.01–0.05% by weight of the monomer and the catalyst is 0.5–1.5% by weight of the monomer.

3. Composition according to claim 1 wherein the amount of monomer is 3–5% of the composition, the amount of the prepolymer is 30–40% by weight of the composition when the prepolymer is an epoxy ester and is 50–60% by weight of the composition when the prepolymer is a hydroxyl or carboxyl terminated acrylic prepolymer, the amount of the graft initiator is 0.02–0.03% by weight of the monomer and the amount of the catalyst is 0.8–1.0% by weight of the monomer.

4. Composition according to claim 1 wherein the graft initiator is ferrous ammonium sulfate.

5. Composition according to claim 4 wherein the catalyst is paratoluene sulfonic acid.

6. Composition according to claim 4 wherein the catalyst is ammonium persulfate.

7. Method for protecting the surface of a steel object, which comprises applying the composition of claim 1 to the surface of the steel object and curing said composition in contact with said surface.

8. Method according to claim 7 wherein the steel object is a steel pipe.

9. Method according to claim 8 wherein the steel pipe is preheated to a temperature of 120°–140° F. prior to application of said composition thereon.

10. Method according to claim 8 wherein said curing is effected in open air for a period of 5–10 minutes.

* * * * *